United States Patent [19]

Davenport

[11] Patent Number: 5,718,629
[45] Date of Patent: Feb. 17, 1998

[54] MACHINE FOR VINING PEAS AND THE LIKE

[75] Inventor: Graham Davenport, Grimsby, United Kingdom

[73] Assignee: Pixall Limited Partnership, Clear Lake, Wis.

[21] Appl. No.: 609,116

[22] Filed: Feb. 29, 1996

[30] Foreign Application Priority Data

Mar. 3, 1995 [GB] United Kingdom ............... 95/04281

[51] Int. Cl.$^6$ .............................. A01D 45/24; A01F 11/00
[52] U.S. Cl. ........................ 460/131; 460/141; 56/327.1
[58] Field of Search ................................. 460/131, 141, 460/129, 130, 132, 142, 143, 149, 150, 63, 70, 128; 56/328.1

[56] References Cited

U.S. PATENT DOCUMENTS

| | | |
|---|---|---|
| 2,325,509 | 7/1943 | Hastwell . |
| 2,504,193 | 4/1950 | Gough et al. . |
| 2,587,289 | 2/1952 | Cook . |
| 3,536,140 | 10/1970 | Looker . |
| 3,552,398 | 1/1971 | Looker et al. . |
| 3,709,231 | 1/1973 | Looker et al. . |
| 3,769,988 | 11/1973 | Burenga . |
| 3,826,267 | 7/1974 | Scribner . |
| 5,370,579 | 12/1994 | Brown et al. . |
| 5,372,547 | 12/1994 | Brown et al. . |

FOREIGN PATENT DOCUMENTS

| | | |
|---|---|---|
| 887 284 | 8/1953 | Germany . |
| 32 40 489 | 5/1984 | Germany . |

OTHER PUBLICATIONS

Product Literature—"Ploeger Self Propelled Pea Harvester—EPD 520" (4pgs). (Date Unknown).

Product Literature—"Hamachek: Stripper Combiner for Green Peas and Lima Beans—Models EPH and SP90" (2 pgs). (Date Unkown).

Product Literature—Mangus & van dec Heijden B.v. "Subject: Process Description"(13 pgs). (Date Unkown).

Product Literature—Klochner Hamachek: "High Flotation Green Pea & Lima Bean Combine—SP90-T"(2 pgs). (Date Unknown).

Product Literature—FMC:"Pod Stripper—PSC–125"(4 pgs). (Date Unknown).

Product Literature—FMC: "The New 6 Wheeler—Model 979" (6 pgs). (Date Unknown).

Product Literature—FMC: "Pod Stripper Combines—Models PSC–156 & 125" (8 pgs). (Date Unkown).

Product Literature—FMC: "Pod Stripper Combine—Model HPSC–156" (2 pgs). (Date Unknown).

Product Literature—FMC: "Pod Stripper—PSC–125"(4 pgs). (Date Unkown).

Product Literature—FMC: "Long Drum—FMC879", (2pgs). (Date Unknown).

Product Literature—FMC: "Harvesters"(2 pgs). (Date Unknown).

Product Literature—FMC: "Pod Stripper Combine-156"(4 pgs). (Date Unkown).

(List continued on next page.)

Primary Examiner—Terry Lee Melius
Attorney, Agent, or Firm—Merchant, Gould, Smith, Edell, Welter & Schmidt, P.A.

[57] ABSTRACT

The present invention provides apparatuses for threshing plant material having seeds contained in pods. Preferably, an apparatus of the invention includes at least two threshing members between which plant material to be threshed is passed. The threshing members are generally constructed and arranged to exert a compressive force on the plant material as it passes therebetween. It is believed that the compressive force exerted on the plant material causes air trapped inside the pods to expand and force the pods open, releasing the seeds contained therein. Apparatuses of the invention include, for example, a pre-threshing apparatus, a vining machine and a harvesting machine. Preferably, an apparatus of the invention provides an efficient method for increasing the yield of undamaged seeds.

22 Claims, 7 Drawing Sheets

OTHER PUBLICATIONS

Product Literature—FMC: "FMC's Efficient Pod Stripper Combines Provide High Yield, Single Pass Harvesting" (8 pgs). (Date Unknown).

Product Literature: Byron: "The SP9500: Another Byron Breakthrough in Vegtable Harvesting" (2 pgs). (Date Unkown).

Product Literature—Byron: "Model 9520 DPC and Model 9400 Series Harvesters" (2 pgs). (Date Unkown).

MACHINE FOR VINING PEAS AND THE LIKE

FIELD OF THE INVENTION

This invention relates to apparatuses for threshing and vining of peas or other similar seeds, and to harvesting machines incorporating the apparatuses of the invention.

BACKGROUND OF THE INVENTION

An existing type of harvesting machine, for example, a pea harvesting machine, is self-propelled and lifts the pea plants at the front end thereof. The plant is passed into a large perforate rotating drum in which is mounted an axially extending rotor with beaters therearound, rotating at a higher speed than the drum. The pea plants are carried by centrifugal force up the inner surface of the drum to the top of the drum and then caused to drop onto the rotor, where the percussive impact of the beaters causes the pods to split. The peas are released and pass through the perforated drum wall for collection below by conveyors. The waste plant material is then discharged.

As the plant material rotates along the drum from the input end to the discharge end, the cycle of lifting, dropping and beating occurs several more times. The remaining pods and waste become more chopped and broken, rendering the material small enough to pass through the perforations (mesh) of the drum walls. Typically, 75% of the peas are discharged in the first half of the drum's length, while the remaining 25% come through in the second half. Since waste material is also increasingly discharged with the peas along the length of the drum, it has been found that, for every 1000 kg of peas produced, 600 kg of waste is also discharged with the desired crop, requiring further separation in subsequent processing.

In order to achieve a satisfactory degree of separation of the peas from the pods, it is necessary to make the drum large, both in length and in diameter. It is also necessary to maintain the long axis of the drum as near to horizontal as possible during operation, to ensure that the plants are dropped onto the rotor at the right point for percussive impact to cause bursting of the pods. A typical machine of this type will therefore be very large and heavy, since it generally requires a two-part chassis, with hydraulic levelling rams between the two parts. Not only is the machine very expensive to build and to operate, but the weight causes compaction of the ground, making future cultivation more difficult.

A further problem with this type of machine is that the impact of the beaters on the rotor with the pods can cause damage to the peas, reducing the quality and therefore value of the crop.

Accordingly, there is a need to increase the efficiency and quality of the separation process of, for example, peas from the remainder of the plant material.

SUMMARY OF THE INVENTION

The present invention provides apparatuses and methods for opening pods to release seeds contained therein. According to the invention, plant material containing pods is subjected to a compressive force which is sufficient to open the pods and allow the seeds to be removed. The invention provides significant advantages in the threshing and vining of crops suitable for the invention. Preferably, the invention provides more cost effective equipment which yields higher levels of undamaged seeds.

According to the invention, pods are open by subjecting pods, and/or plant material containing pods, to a compressive force sufficient to open the pods. In one embodiment, the invention provides apparatuses for "threshing" or "vining" of peas, beans or other plant material where the sought after seed is enclosed in a covering such as a pod. As used herein, the term "threshing" and other derivatives of "thresh" mean opening the pod. Once the pod is open, the seed may be released. The term "vining" and other derivatives of "vine" refer to processing a plant material removed from a field to provide seeds of the plant material separated from the waste plant material (eg. pods, stems, legumes). Hence, threshing is one stage of the vining process.

In one embodiment of the invention, there is provided a threshing apparatus for removing seeds contained in pods by compressing the plant material containing pods between at least two threshing members. Each threshing member has a first end and a second end. According to the invention, the threshing members are arranged to exert a compressive force on the plant material passed between the threshing members such that the force exerted on the pod and plant material is sufficient to open the pods. At least one of the threshing member may be perforate.

In a preferred embodiment, an apparatus of the invention provides a compressive force on the pod and plant material such that the force exerted is substantially constant regardless of the quantity of pod or plant material moving between the threshing members of the apparatus. Preferably the amount of force exerted may be varied by the equipment operator based on harvesting conditions and crop variety threshed.

Threshing members suitable for the invention include, for example, drums, conveyor belts, rotors, or any combination thereof. Preferably, at least one of the threshing members is rotatably driven by motors or other driving sources known in the art. Preferably, at least one of the threshing members is driven at a surface speed greater than the surface speed of a second threshing member.

According to the invention, it is preferred that at least one of the threshing members is mounted using a mounting arrangement which permits the threshing member to move towards and away from a second threshing member. This provides for a substantially constant force to be maintained on material moving between the threshing members regardless of the quantity of pod or plant material between the members. An example of this type of arrangement provides for the mobile threshing member to be attached to a roller which can move in or on a track.

In a preferred embodiment, the mounting arrangement of a threshing member provides for each end of the threshing member to move independently of the other end. Alternatively, one end of a threshing member may be mounted using a mounting arrangement which permits the threshing member to pivot while the other end of the threshing member may move toward or away from a second threshing member. An example of a mounting arrangement which provides for pivoting is a self-aligning bearing.

The ability of a threshing member of an apparatus of the invention to move toward or away a second threshing member may also be achieved by using a mounting arrangement which includes at least one hydraulic ram. Preferably, the hydraulic ram has a pressure control system which permits a substantially constant hydraulic pressure to exist within the hydraulic ram.

In a more economical embodiment, a threshing member of an apparatus of the invention may move towards and away from a second threshing member through the use of a spring to bias the moving threshing member. Preferably, the spring maintains a substantially constant force on the pod and plant material between the threshing members.

A threshing member of the invention may further include protrusions for enhancing movement of pod and plant material to be compressed between the threshing members of the invention.

In one embodiment of the invention, a threshing apparatus includes a pre-threshing apparatus. According to this embodiment, at least one threshing member is a rotor and a second threshing member is preferably a conveyor belt. Preferably, the rotor is mounted above the conveyor belt. According to this embodiment, at least one of the threshing members is driven at a surface speed of 10 to 40 percent, preferably greater than 25 percent greater than a second threshing member.

In another embodiment, a threshing apparatus of the invention is a vining machine. According to this embodiment a vining machine includes at least two threshing members. The threshing members are arranged to exert a compressive force on the plant material passed between the threshing members such that the force exerted on the pod and plant material is sufficient to open the pods.

In a preferred embodiment, a first threshing member includes a rotatable drum which has an opening for introducing plant material. The wall of the drum is preferably perforated and has an internal and external surface. A second threshing member is also provided. The second threshing member is preferably a rotatable rotor which is mounted within the rotatable drum by a mounting arrangement which provides for the rotor to move laterally within the drum. By moving laterally within the drum the rotor preferably maintains a substantially constant force on plant material introduced in the opening of the drum and compressed between the rotor and the internal surface of the drum. The drum and the rotor are preferably independently rotatable.

The invention also provides a machine for vining. According to the invention, a machine for vining includes a first and a second threshing apparatus. According to this embodiment, one threshing apparatus may include a first and second threshing member. The first threshing member is preferably a conveyor belt and the second threshing member is preferably a rotor which is mounted above the conveyor belt.

In another embodiment, the invention provides a harvesting machine. A harvesting machine according to the invention, includes a vehicle. Mounted on the vehicle is a threshing apparatus and a gathering arrangement. According to the invention, a suitable gathering arrangement provides for gathering vines and feeding the vines to the threshing apparatus. The threshing apparatus of a mobile harvesting machine according to this embodiment of the invention may be a first stage threshing apparatus or a vining machine. Alternatively, a mobile harvesting machine may include a first and second threshing apparatus, for example, a first stage threshing apparatus and a vining machine. A mobile harvesting machine of the invention may be self-propelled or may be mobilized by towing with an auxiliary vehicle.

The present invention also provides a process for removing seeds contained in a pod. According to the method of the invention, a seed is removed from a pod by exerting a compressive force on a plant material, which includes, pods such that the compressive force is sufficient to open the pods.

According to the invention, the process for removing seeds contained in pods may be conducted by applying a compressive force to a plant material including pods using a threshing apparatus. According to this embodiment a threshing apparatus may include at least two threshing members between which a plant material including pods passes. Accordingly, the threshing members are arranged to exert a compressive force on the plant material sufficient to open the pods. According to this embodiment of the invention, a threshing apparatus may be a first stage threshing apparatus.

In addition, the method of the invention may be performed by passing plant material including pods through a first and a second threshing apparatus. According to this embodiment, a first or second threshing apparatus may include a first threshing member which is a rotatable drum. The rotatable drum preferably has an opening for introducing plant material inside. The threshing apparatus also includes a second threshing member which is preferably a rotatable rotor. The rotor is mounted using a mounting arrangement which provides for the rotor to move laterally within the drum in order to maintain a substantially constant force on a plant material introduced into the opening of the drum and compressed between the motor and the internal surface of the drum. According to this embodiment, the drum can be rotated and the rotor can be rotated independently of the drum.

The process of the invention may further be performed using a mobile harvesting machine. According to this embodiment, a mobile harvesting machine includes a threshing apparatus of the invention.

DETAILED DESCRIPTION OF THE INVENTION

The present invention provides apparatuses for "threshing" or "vining" plant material containing seeds enclosed in pods. Preferably, the apparatuses of the invention provide high yields of undamaged peas using cost-effective threshing machinery. The apparatuses of the invention provide for removal of seeds from pods by opening the pods through the use of compressive, rather than percussive, forces.

The invention provides multiple apparatuses for threshing seeds including a first stage threshing device, a vining machine, a machine for vining, and a harvesting machine.

It is noted that throughout the specification, the apparatuses may be referred to in terms of "peas" for example, "pea vining machine" and "pea harvesting machine". One skilled in the art will readily recognize that the present invention is for use with any seed crop which may be threshed or vined using an apparatus of the invention. Accordingly, the use of the term "pea" is for exemplary purposes and is not intended to limit the scope of the invention. Moreover, it will be noted that several places throughout the specification guidance is provided through examples. In each instance, the recited examples serve only as a representative group. It is not meant, however, that the examples are exclusive.

Apparatuses of the invention, including a first stage threshing apparatus and a vining machine may be used together in another apparatus, for example, a harvesting machine. Alternatively, the first stage threshing apparatus and vining machine of the invention may be advantageously used alone or together with prior art harvesting machines to provide increased yield efficiency. Accordingly, a first stage threshing device or vining machine of the invention need not be installed on a harvesting machine at the time of original manufacture but may be retro-fit to previously existing or later built harvesting machines.

As described above, conventional vining machines, for example pea vining machines, have been constructed for opening pea pods by percussive impact of the beater on the pea pods. However, an aspect of the present invention is the discovery that the cycle of pod opening in percussive machines may sporadically change. At these times, the intended percussive effect of the beaters on the pods is diminished because of the increased mass of plant material in the drum. During these times, it is believed that pod opening increasingly occurs as a result of unintended compression of plant material between the rotor and the drum wall. While the inventors do not wish to be limited to a single theory, it is believed that compression may cause air trapped inside the pods to expand, forcing the pods open (eg. exploding open) and releasing the seeds. It is further believed that the pods may open at the weakest point, typically along the seam. Hence, pursuant to this discovery, the present invention provides apparatuses which open pods by using compressive forces. Unlike conventional machines, pod opening in an apparatus of the invention using compressive force is not unintentional but rather, it is the predominant force. Percussive force is not necessary.

It has also been discovered that during periods of increased load in the drum of conventional pea vining machines, there is reduced damage to the peas harvested. As the load in the drum is decreased, the damage to peas is increased. Accordingly, another aspect of the present invention is an apparatus which preferably opens pods using compressive forces to yield increased amounts of undamaged peas.

In its simplest form, an apparatus of the invention exerts a compressive force on a plant material containing pods to open the pods. Typically, an apparatus of the invention includes at least two opposing surfaces between which plant material containing pods may be compressed. During operation, a plant material containing pods may be introduced between the opposing surfaces of the apparatus. Preferably, the force of the compression exerted on the plant material between the two surfaces is sufficient to open the pods. Once open the seeds may be released. It is believed that the "seam" of the pod opens upon compression to release the peas.

As used herein a surface which can be used to compress plant material according to the invention is referred to as a "threshing member". An apparatus, according to the invention, includes at least two threshing members between which plant material, including pods, passes. Typically, the threshing members are arranged to exert a force on the material passing therebetween, such that the force exerted on the material is sufficient to open the pods and release the peas inside. While the inventor recognizes that more than two threshing members may be used, in general, two threshing members are envisioned for an apparatus of the invention.

The force exerted by the threshing members on the plant material preferably remains substantially constant irrespective of the load of plant material between the threshing members. The force may be set according to harvesting conditions and crop type. Preferably, the operator of the apparatus can control the force exerted. As discussed below, the force exerted on plant material between the threshing members may be controlled using hydraulic or spring operated devices. In addition, the force exerted on the plant material may be adjusted by altering the rotational speed of one or more threshing members which will affect the density of plant material between the threshing members.

As used herein, the phrase "substantially constant force" means that the compressive force, which is set for harvesting conditions and crop type, does not vary significantly from the levels set due to the quantity of plant material between threshing members so as to prevent obtaining acceptable levels of pod opening with acceptable yields of undamaged peas.

One or more of the threshing members may be rotatably driven. If more than one threshing member is driven, preferably the drive speed is different for each member such that the surface speed of one member is in excess of the surface speed of the other threshing member. Drivers which may be used to rotate a threshing member are known in the art, and include, for example, hydraulic or electric motors.

The threshing members of the invention may be drums, conveyor belts, rotors or similar threshing member, and any combination thereof. If the threshing member is a drum, preferably the wall of the drum is perforate. Preferably, at least one of the threshing members is a rotor.

Generally, a threshing member will have two ends. In the case of a drum or rotor, the ends are at opposite aspects of the longitudinal dimension of the threshing member. In the case of a conveyor belt, the ends are at opposite aspects of the width dimension of the threshing member.

When two threshing members are used, it is preferred that at least one of the threshing members is constructed and arranged to permit the threshing member to move towards and away from the other threshing member. Construction and arrangement of one threshing member for movement towards and away from the other threshing member provides for maintaining a substantially constant force on plant material compressed between the threshing members. It is advantageous if the mounting arrangement permits each end of the threshing member to move independently of the other end.

In a preferred embodiment, at least one end of a threshing member may use a mounting arrangement including a roller running in or on a track. The mounting arrangement may be mounted adjacent to the track and act on a mounting for the roller. Preferably, at least one end of the threshing member includes an arrangement to permit pivoting of that end. Such an arrangement for pivoting includes, for example, a self-aligning bearing.

A mounting arrangement constructed and arranged to permit one threshing member to move towards and away from a second threshing member includes, for example, hydraulic or spring operated devices. A mounting arrangement of the invention may include at least one hydraulic ram with pressure control system to maintain a substantially constant hydraulic pressure therein. Suitable pressure control systems are known in the art. According to this arrangement, a threshing member including a hydraulic ram may automatically move towards and away from a second threshing member according to the quantity of plant material therebetween.

Alternatively, the mounting arrangement of a threshing member may include at least one spring to bias the threshing member towards the other threshing member, causing a substantially constant force to be maintained on the plant material therebetween.

In one embodiment, at least one of the threshing members may be provided with protrusions, adapted to move the plant material through the threshing device. Preferably, when one threshing member is in the form of a rotor it is provided with protrusions. The protrusions may be in the form of paddles.

In a preferred embodiment, at least one of the threshing members is driven at a surface speed 10 to 40 percent, more preferably 25 percent, faster than a second threshing member.

In one embodiment, an apparatus of the invention provides a vining machine. According to this embodiment, a vining machine includes at least two threshing members. Preferably, one threshing member includes a rotable, drum and a driver for rotating the drum. The wall of the drum has an external and internal surface. Preferably, the wall is perforate. Generally, the drum includes an opening through which the plant material may be introduced.

A second threshing member preferably includes a rotor mounted within the drum and extending over the length thereof, and a driver for rotating the rotor independently of the drum. The rotor may include spindles for attaching a mounting arrangement to the rotor. According to this embodiment, the mounting arrangement is preferably configured to provide for the rotor to move towards and away from the inside wall of the drum to maintain a substantially constant force on plant material compressed between the rotor and the internal surface of the drum.

In a preferred embodiment, the mounting arrangement for the rotor is configured to permit each end of the rotor to move independently of the other which provides for the compressive force to be more evenly applied along the length thereof. Preferably, the mounting arrangement includes a hydraulic ram with a pressure control system to maintain a substantially constant hydraulic pressure therein. This type of hydraulic ram provides for the rotor to automatically move toward and away from the internal wall of the drum according to the quantity of material therebetween. Preferably, the mounting arrangement at each end of the rotor includes a roller running in or on a transverse track. A first end of the hydraulic ram may be mounted on or near, for example, the mounting for the roller, and a second end of the hydraulic ram may be mounted on or adjacent to the track.

The rotor may be provided with a hydraulic ram at only one end thereof, in this embodiment, the other end of the rotor may be pivotally mounted, preferably using a self-aligning bearing.

In another embodiment of a vining machine, the mounting arrangement for the rotor may include a spring arrangement to bias the rotor towards the wall of the drum to provide a substantially constant force to be maintained on the plant material therebetween. Spring arrangements may be included at one or both ends of the rotor. Where the spring arrangements are provided at only one end of the rotor the other end of the rotor may be mounted using an arrangement which allows the rotor to pivot about the end without the spring. Such an arrangement includes, for example, a self-aligning bearing.

The mounting arrangement may be adapted to provide a range of movement of the rotor of about 100 mm away from the drum wall. Preferably 70 mm of movement is provided.

The rotor is preferably provided with a plurality of protrusions, which may be in the form of paddles adapted to move the plant material between the rotor and the perforate drum. Preferably such paddles run along the length of the rotor and are spaced at intervals around the circumference.

On the inside of the rotating drum there is preferably provided a device for stripping away any crop material retained within the perforations of the wall of the drum. Such a device includes, for example, a brush adapted to push back into the drum any small particles trapped in the perforations.

In another embodiment of the invention the seeds, for example, peas, and small plant waste material passing through the perforations in the perforate wall of the drum fall onto a separating device, preferably a draper belt. The separating device provides for separation of peas from the small plant waste material. As used herein, a draper belt includes a belt, at least two rollers, at least one of which is driven and an arrangement for agitating or turning the belt. The arrangement to agitate the belt may include at least one protrusion attached to the underside of the draper belt which may cooperate with at least one roller of suitable shape to provide agitation. Preferably at least one roller of the belt is polygonal in section and more preferably substantially hexagonal. Preferably there are a series of protrusions on the underside of the belt which may be in the form of slats, most preferably wooden slats. The slats co-operate with the roller(s) to provide agitation.

A first conveyor may be mounted below the draper belt and arranged such that the peas which roll down the draper belt land on the first conveyor. The first conveyor preferably carries the peas to a first cleaning device, which is, for example, a suction fan which sucks off leaf and waste material. The peas may be transferred from the first conveyor via the second cleaning device to an elevator, which is preferably a bucket elevator. From the elevator the peas may be deposited onto a second conveyor which preferably transports the peas via a second cleaning device, preferably in the form of a suction cleaning fan and/or a rotable perforate drum, to a holding hopper. Preferably the holding hopper is capable of being unloaded while the vining machine is in operation.

In another embodiment, an apparatus of the invention is a "pre-threshing apparatus" or a "first stage threshing apparatus". According to the invention, a first stage apparatus provides for opening of a pod associated with plant material without separating the seeds contained in the pod from the plant material. Typically, a pre-threshing apparatus includes at least two threshing members between which pod and plant material passes. The threshing members are arranged to exert a force on the plant material passing therebetween sufficient to open the pods. Preferably the pods are opened with little damage to the seeds contained therein.

Preferably at least one of the threshing members is in the form of a rotor. A second threshing member may include a conveyor belt. Most preferably, the pre-threshing device includes a drivable conveyor belt with a rotor mounted above. Preferably, one or more of the threshing members is driven at a surface speed 10 to 40 percent, more preferably 25 percent, faster than a second threshing member.

Either or both the rotor or the conveyor belt may be provided with a mounting arrangement which provides a compressive force to be exerted on pods and plant material therebetween. As described above, preferably the compressive force applied can be varied by the operator based on crop type and harvesting conditions. Adjustment of the compressive force may be achieved by mounting one of the threshing members to a hydraulic cylinder which is connectable to a hydraulic circuit. The hydraulic circuit may include a pump to provide oil pressure and a valve to enable the oil pressure in the hydraulic cylinders to be controlled.

The pre-threshing apparatus of the invention may form part of a machine for vining. As used herein, a "machine for vining" includes any machine which can vine a plant material. More preferably, the pre-threshing apparatus of the invention is used with a vining machine of the invention to form a machine for vining. An advantage of the pre-threshing apparatus is that it can thresh a significant portion of the pods before, for example, the plant material enters the threshing drum of a vining machine of the invention.

The present invention also provides a harvesting machine. Typically, the harvesting machine is mobile. A harvesting machine may include a vehicle with a vining machine according to the invention mounted thereon. A harvesting machine may also include a pre-threshing apparatus and a gathering arrangement for removing vines from the field and feeding the vines to the vining machine.

The invention also provides a mobile harvesting machine including a vehicle with a pre-threshing apparatus according to the invention mounted thereon and a gathering arrangement for gathering vines and feeding the vines to the pre-threshing apparatus.

The invention further provides a mobile harvesting machine including a vehicle having a pre-threshing apparatus according to the invention mounted thereon, a vining machine and a gathering arrangement for gathering vines and feeding the vines to the vining machine via the pre-threshing apparatus.

A mobile harvesting machine, according to the invention, may be self-propelled or may be propelled by an auxiliary source such as towing by another vehicle.

DESCRIPTION OF THE PRIOR ART

Figure 1:
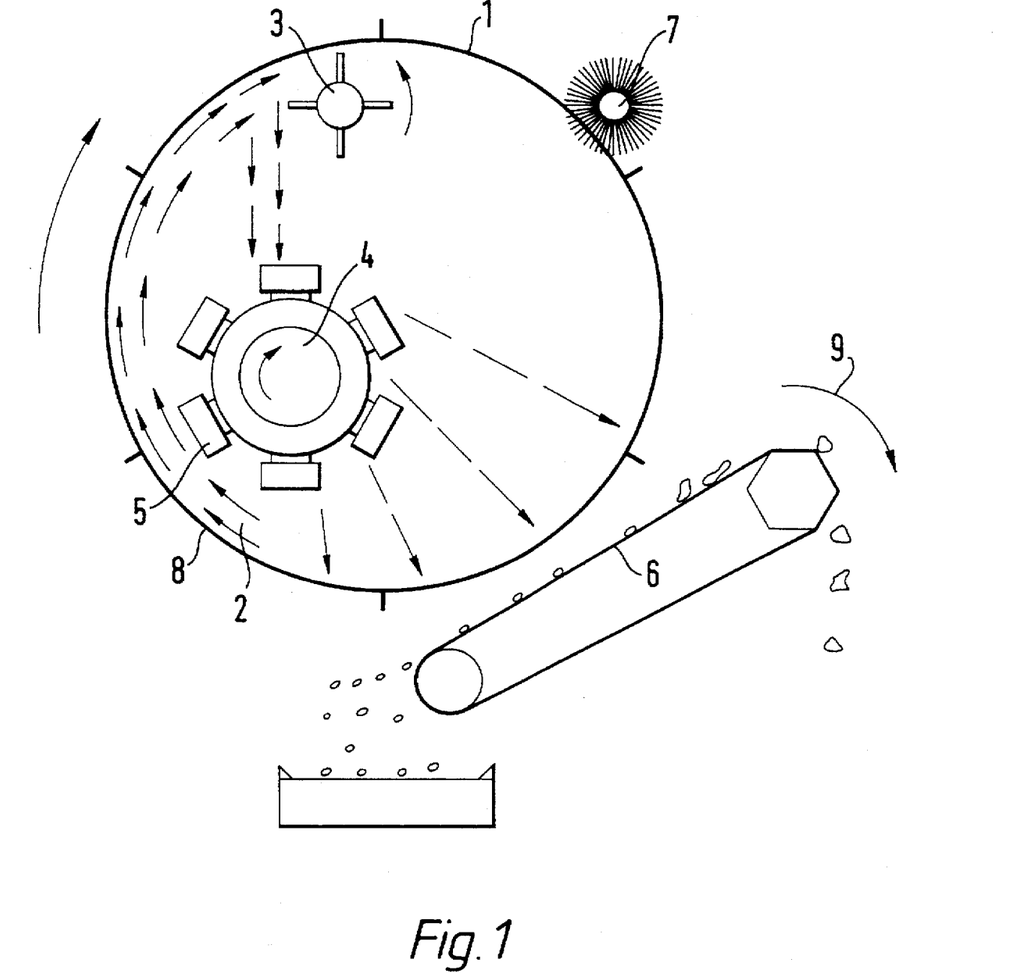
FIG. 1 is a side elevational view of a conventional pea vining machine.

Referring to FIG. 1, a conventional pea vining machine typically includes a drum 1, having a mesh wall 8. The drum is rotatable around its longitudinal axis at a speed sufficient to cause pea plant material 2 introduced into the drum to be moved upwardly along the interior surface of the drum by centrifugal force. A paddle device 3 is mounted within the drum near the apex thereof. The paddle device 3 rotates to detach any material 2 which does not fall off the interior surface of the mesh wall 8 of the drum 1 under the influence of gravity as it approaches the apex. A rotor 4 is mounted within the drum 1 with its axis of rotation generally parallel to that of the drum, but offset therefrom. The rotor 4 has beaters 5 around its periphery, and is typically rotated at a higher speed than the drum.

As the material 2 falls down onto the rotor 4, it is struck by the beaters 5, and the percussive impact of the beater causes the pea pods to split, allowing the peas to drop downwardly and through the mesh wall 8 of the drum 1 to land on a belt 6. The rotation of the belt relative to the drum is shown by arrow 9. The rotation of the belt is arranged so that the peas will tend to roll downwardly against the direction of the rotation of the belt while any waste material escaping through the mesh wall 8 will tend to be carried upwardly by the belt to be discharged to the side of the machine. In the case of a mobile harvesting machine, typically, the waste material simply falls back onto the field. Waste material adhering to the exterior of the mesh wall 8 of the drum 1 is cleaned off by brushes 7.

DETAILED DESCRIPTION OF THE ILLUSTRATED EMBODIMENTS

Figure 2:
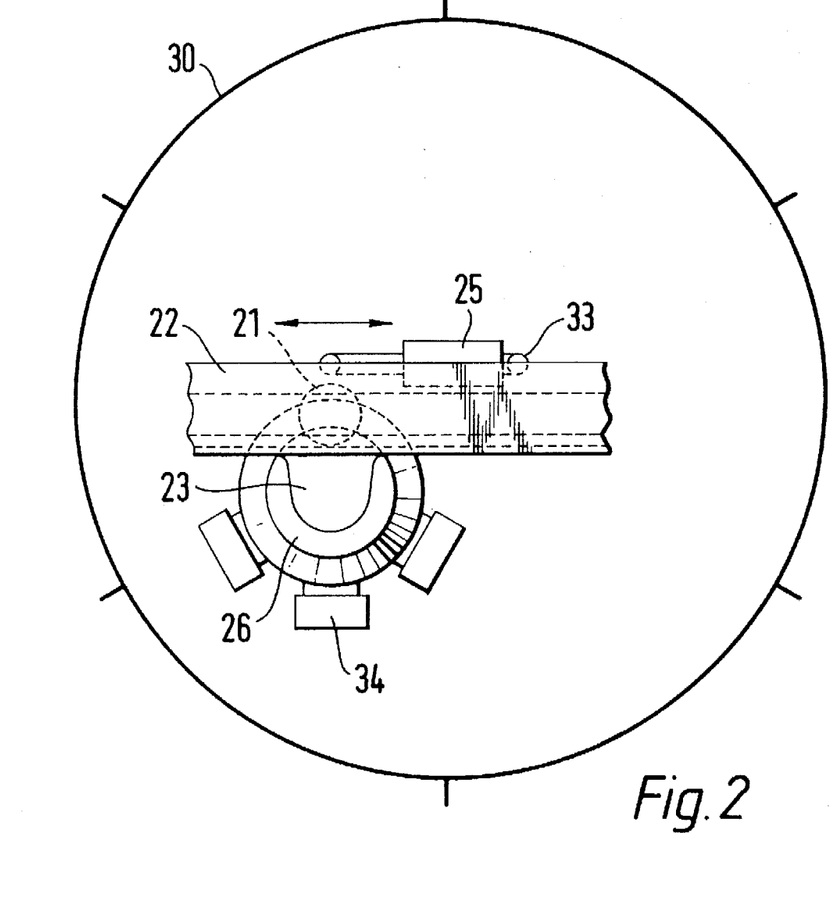
FIG. 2 is a side elevational view of a vining machine according to the invention.
Figure 3:
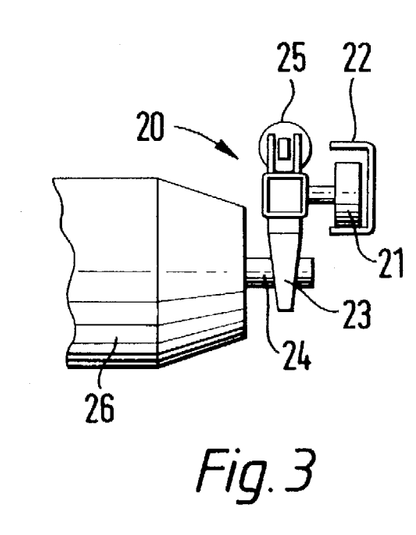
FIG. 3 is a front elevational view of an embodiment of a mounting arrangement of the rotor shown in FIG. 2.
Figures 4, 5:
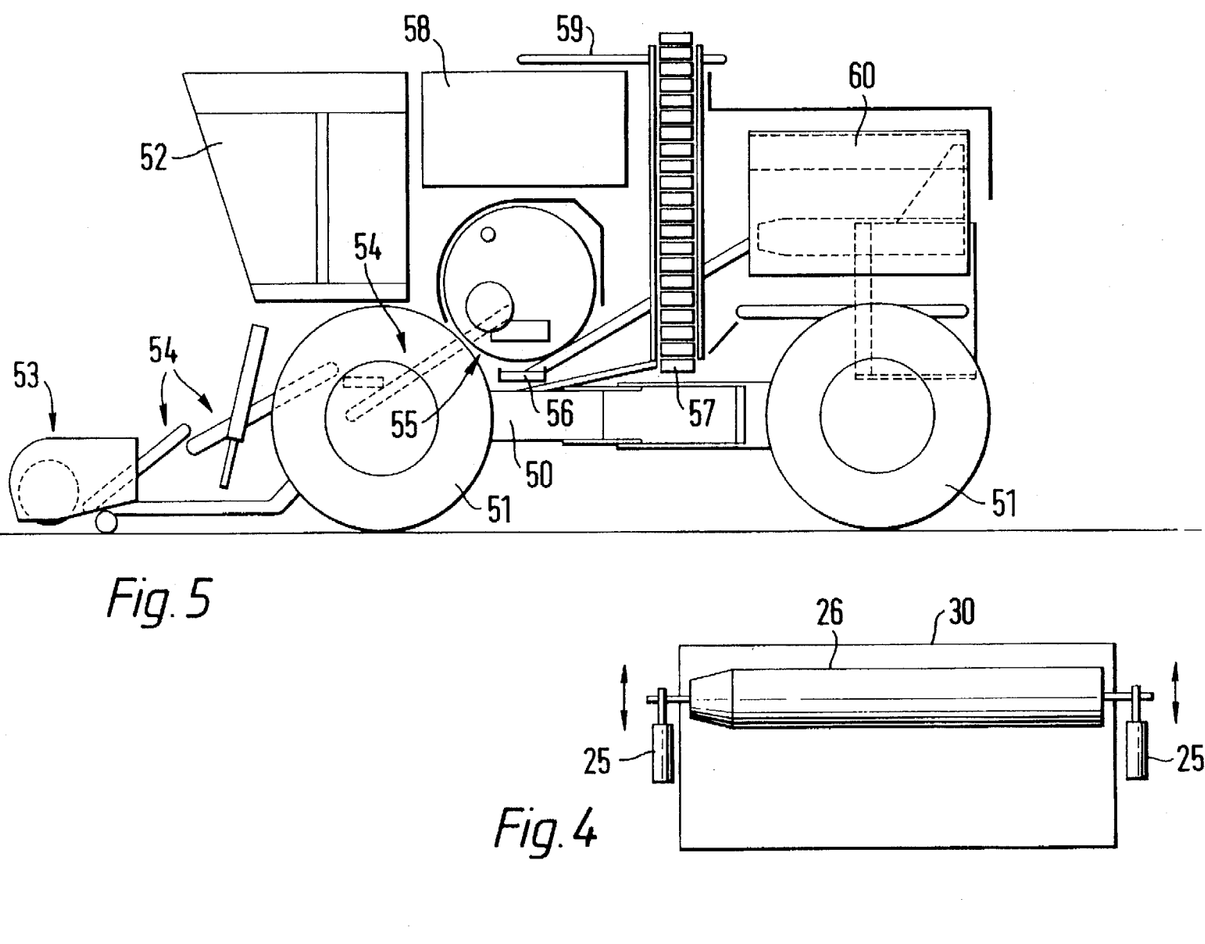
FIG. 4 is a top view of an embodiment of the vining machine shown in FIGS. 2 and 3.
FIG. 5 is a side elevational view of a harvest machine incorporating a vining machine of the type shown in FIGS. 2 to 4.

One preferred embodiment of a vining machine of the invention is illustrated in FIGS. 2 to 4. According to this embodiment, a pea vining machine includes a drum 30, a rotor 26 and a rotor mounting arrangement 31.

According to the invention, the drum 30 has an inside and outside wall. Preferably the wall is sufficiently perforated for seeds of the crop, for example, peas, to pass through. The rotor 26 has two ends and can be mounted within the drum (only one end of the rotor 26 is shown in FIGS. 2 and 3). Typically, the rotor includes a spindle 24 at each end for mounting in the drum 30.

According to this embodiment, the rotor 26 is mounted within the drum 30 by a carriage 20 having a roller 21 and a transverse track 22. The carriage of this embodiment includes a support bearing 23 carrying the spindle 24 of the rotor, and a hydraulic ram 25 extending to a fixed mounting 33, for example, on track 22. When this type of mounting arrangement is used at both ends of the rotor, preferably, the tracks at each end of the rotor 26 are mounted within the drum 30 directly opposite each other.

Preferably, the hydraulic system controlling the hydraulic pressure of the ram 25 is of the pressure compensating type in which fluid pressure over a predetermined limit is relieved, allowing the ram to retract until the pressure within it is again below the limit. This means that the rotor 26 can slide laterally towards the inside wall of the drum until the pressure exerted on the material trapped between it and the wall reaches a predetermined figure, at which point no further movement of the rotor towards the wall is possible. If the amount of material increases, the ram 25 is forced to retract, withdrawing the rotor 26 from the inside wall of the drum. If the amount of material in the gap between the rotor and the wall decreases, the ram extends, pushing the rotor 26 towards the inside wall of the drum. In this way, a substantially constant force is maintained by the rotor on material coming between it and the wall of the drum, at the optimum level for opening the pods. The efficiency of separation is thus kept as high as possible.

Both the drum 30 and the rotor 26 can rotate around their long axes. The rotational speed of the drum 30 is about 25 to 35 revolutions per minute, depending on the conditions. The rotor, by contrast, preferably rotates at about 150 to 190 rpm. Generally, all drives of the vining machine are hydraulic motors supplied from a pump driven by a diesel engine. For example, in the case where the pea vining machine is part of harvesting machine, the main engine providing power to move the vehicle, may drive the vining machine using hydraulic motors.

The carriages 20 are arranged such that there may be pivoting of the rotor 26 relative to each carriage. Pivoting provides for each end of the rotor to move independently according to the conditions nearer to that end. Thus, for example, one end of the rotor 26 having a small quantity of plant material between it and the drum may be moving towards the wall of the drum at the same time the other end of the rotor may be moving away from the wall to accommodate a larger quantity of plant material.

Paddles 34 may be included on rotor 26, in order to help move the plant material between the rotor 26 and the drum 30.

The pea vining machine according to the invention may also be provided with the paddle device 3 and brush 7 as described with reference to FIG. 1. The paddle device 3 serves to remove any crop material retained within the perforations of the wall of the drum, while brush 7, positioned on the outside of the drum removes material adhering to the drum from the outside thereof. The paddle device 3 rotates with the paddle tips adjusted to provide adequate crop removal to clear the perforations. In one preferred embodiment, the paddle tips are approximately 19 mm from the out wall of the drum.

FIG. 5 shows one embodiment of a harvesting machine according to the invention. According to the embodiment shown, a pea harvesting machine includes two vining machines for enhanced efficiency of vining. The embodiment of FIG. 5 includes a self-powered wheeled vehicle having a chassis 50 mounted on four wheels 51, with a driver/operator's cab 52 at the front end thereof. Extending forward of the chassis 50 is a powered stripper 53 which gathers and lifts the pea vines onto a series of conveyor belts 54 which in turn lift the vines to deliver them into the drum of a first pea vining machine 55 in accordance with the invention. Peas released from pods are delivered by a conveyor belt 56 running beneath the machine 55 to a lifting belt 57 which lifts the peas into a holding tank 58 via a further conveyor belt 59. The residue material emerging from the first machine 55 are conveyed to a second vining machine 60. In the embodiment shown, the second vining machine 60 is arranged at right angles to, and to the rear of, the first vining machine. Further extraction takes place at the second vining machine in the same manner as in the fist vining machine, to ensure that the maximum vining efficiency is achieved. The waste vines coming out of the second machine 60 are then deposited to the rear of the vehicle, and may be ploughed in or otherwise disposed of.

Figure 6:
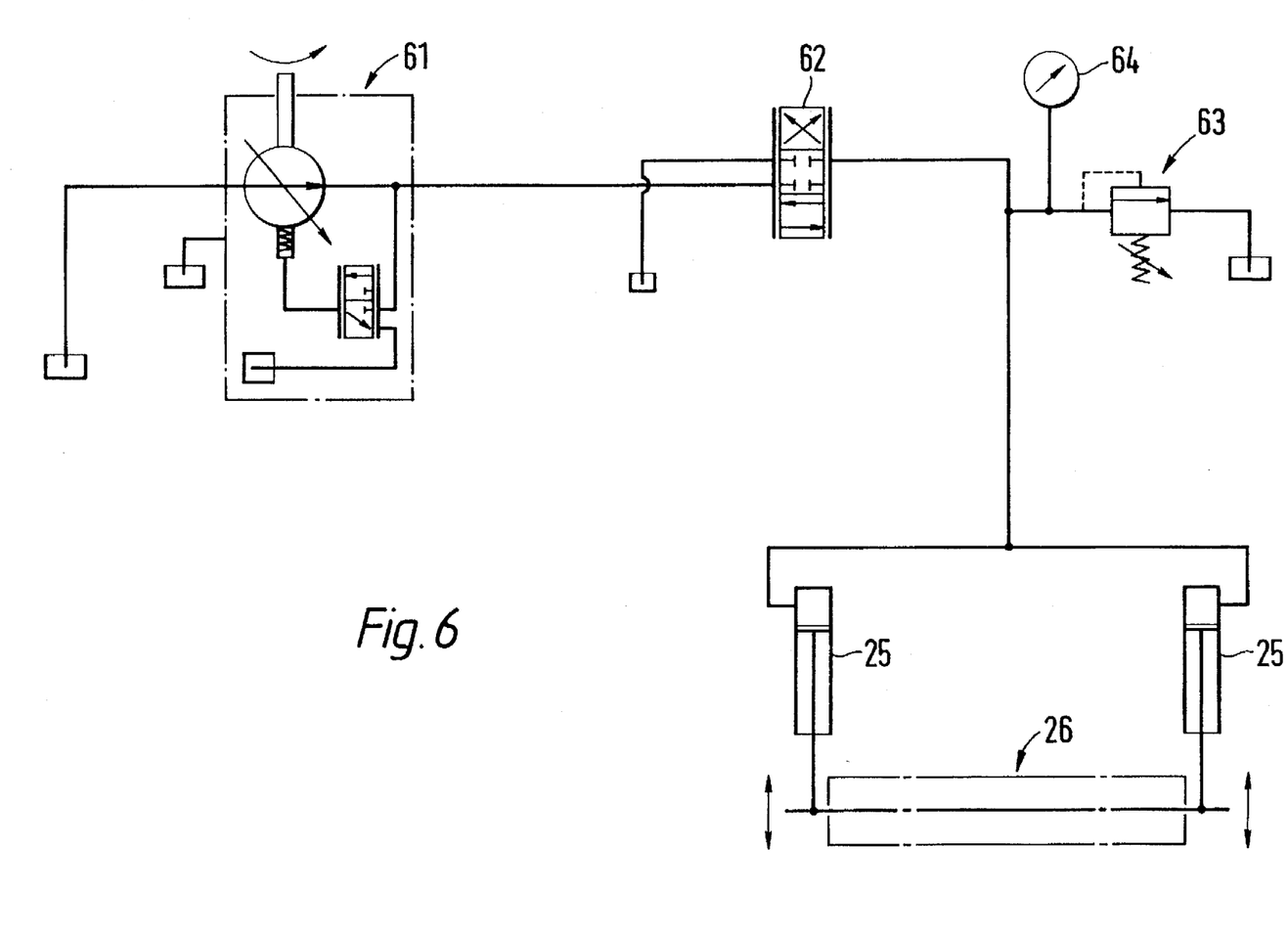
FIG. 6 is a diagrammatic representation of an embodiment of a hydraulic circuit controlling the movement of the rotor in an apparatus of the invention.

An example of the control of the hydraulic pressure to the rams 25 of rotor 26 of the embodiment in FIGS. 2 and 3 may be understood by reference to FIG. 6. According to this embodiment, a variable displacement pump 61 generates a constant system pressure of about 170 bar and allows the volumetric flow rate to change to suit requirements. The flow of oil is directed to the hydraulic rams 25 via an on-off valve 62 and a pressure-regulating valve 63, fitted in the vehicle cab to permit the operator to increase the circuit pressure as conditions vary. A gauge 64 indicates the system pressure. It will be seen that, with the rams 25 supplied in parallel, a generally uniform pressure is applied to the plant material between the rotor and wall of the drum along the length thereof. In a preferred embodiment, the pressure at the hydraulic ram is about 35–40 bar.

An advantage of a vining machine in accordance with the invention is that the separation of the peas from the pods occurs with much higher efficiency than with the conventional arrangement, substantially reducing the size of drum required. Where the vining machine is part of a mobile harvesting machine, the overall size and weight of the harvesting machine can be reduced, in turn reducing its capital and running costs, as well as reducing the compaction effects on the soil in which the peas are grown. Further, the requirement to maintain the drum substantially level during operation is removed, thus avoiding the need for a complex double chassis arrangement for the vehicle, giving further benefits in reduction of size, weight and complexity of the machine.

A further advantage of the machine is that less damage is caused to the peas due to threshing, when compared with devices of the prior art.

Another embodiment of the invention provides a pre-threshing apparatus. In typical use, it is anticipated that the pre-threshing apparatus of the invention will be used in combination with a vining machine of the invention. According to the invention, a pre-threshing apparatus can be combined with a vining machine of the invention or with prior art pea vining machines. Additionally, a pre-threshing apparatus on a harvesting machine may be combined with a pea vining apparatus at the time of manufacture of a pea harvesting machine or retro-fit to a harvesting machine which when manufactured only included a pea vining machine of the present invention or in the prior art.

A pre-threshing apparatus of the invention provides for threshing of pods before the plant material contacts a pea vining machine. An advantage of the pre-threshing apparatus of the invention is that it can thresh at least 25%, preferably, at least 50% of pods before the plant material enters the drum of the pea vining machine. This aspect of the invention provides a significant increase in threshing capacity. For example, by combining a pre-threshing apparatus with a pea vining machine of the invention, the entire pea harvesting machine can be reduced in size. In addition, where a pre-threshing apparatus is retro-fitted to a pea vining machine not originally manufactured for the device, the threshing capacity of the threshing drum can be increased.

Figure 7:
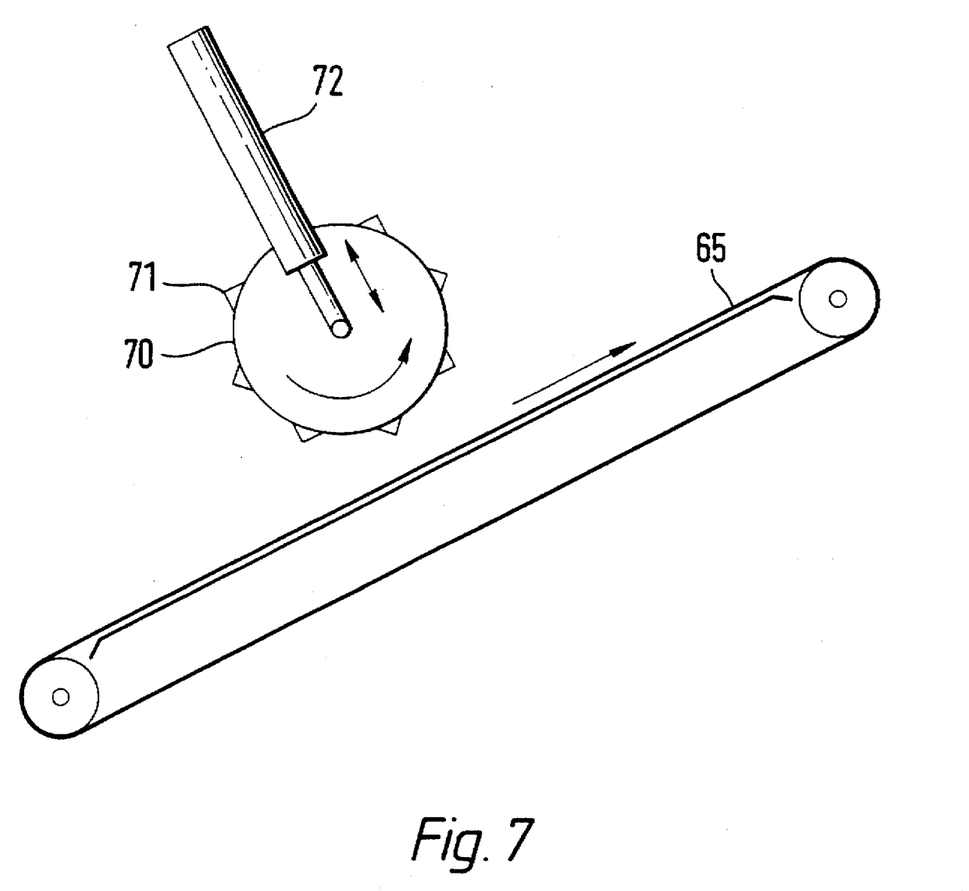
FIG. 7 is a side elevational view of an embodiment of a pre-threshing apparatus of the invention.
Figure 8:
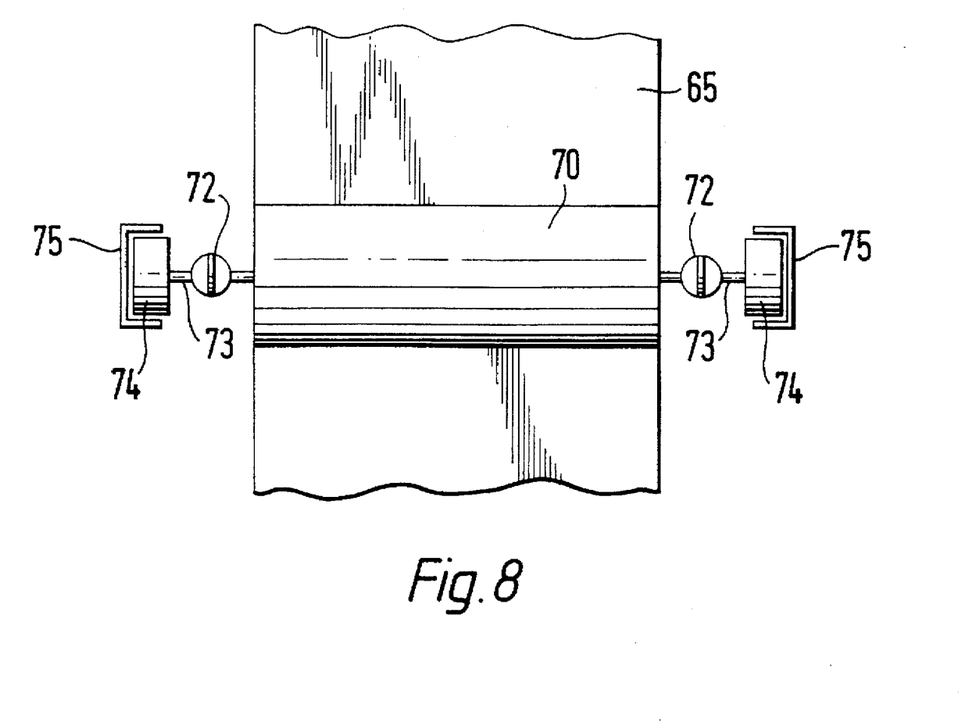
FIG. 8 is a top elevational view of the pre-threshing apparatus of FIG. 7.
Figure 9:
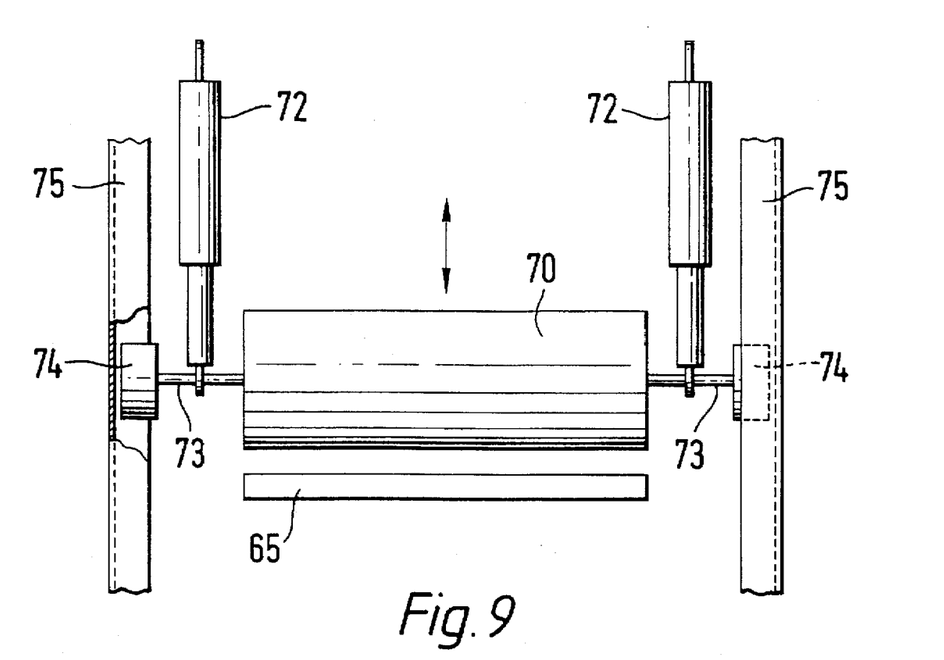
FIG. 9 is a front elevational view of the pre-threshing apparatus of FIG. 7.

FIGS. 7 to 9 show a preferred embodiment of a pre-threshing apparatus of the invention.

According to this embodiment, a pre-threshing apparatus includes a conveyor belt 65, above which is mounted a rotor 70. The rotor 70 includes hydraulic rams 72, which provide for movement of the rotor 70 towards and away from the conveyor belt 65, according to the amount of material being passed between the threshing members. The hydraulic rams 72 are connected to a hydraulic circuit such as that shown in FIG. 6. According to this embodiment, rotor 70 is driven so that its surface speed is approximately 25% faster than that of the belt below. As the crop passes through the pre-threshing apparatus, it is subjected to both compression (due to the force exerted by the rotor on the plant material) and rubbing (due to the different surface speeds of the conveyor 65 and the rotor 70) actions. Preferably, 50% or more of the pods are opened as a result of these actions. In the embodiment shown, rotor 70 is provided with a plurality of protrusions 71 which run the length of the rotor 70 and are spaced around the circumference thereof.

Typically, peas are not separated from other plant material at the pre-threshing stage. Rather, all material is transferred to the main threshing drum.

FIGS. 8 and 9 show the mounting of rotor 70 in tracks which are not shown in FIG. 8. Rotor 70 is axially mounted on a shaft or spindle 73. The ends of the shaft are carried in bearings (not shown), the bearings are carried in rollers 74. Tracks 75 are present at each end of the shaft 73, and are agitated to co-operate with rollers 74 to permit sliding of rollers 74 in tracks 75. Movement of the rotor towards or away from the conveyor 65 is caused by hydraulic cylinders 72. One end of each hydraulic cylinder 72 is attached to shaft 73, the other end is attached to a fixed point on the frame (not shown). The frame may be a part of the chassis of the harvesting machine which includes a first stage threshing device as described with reference to FIGS. 7 to 9.

Figures 10, 11:
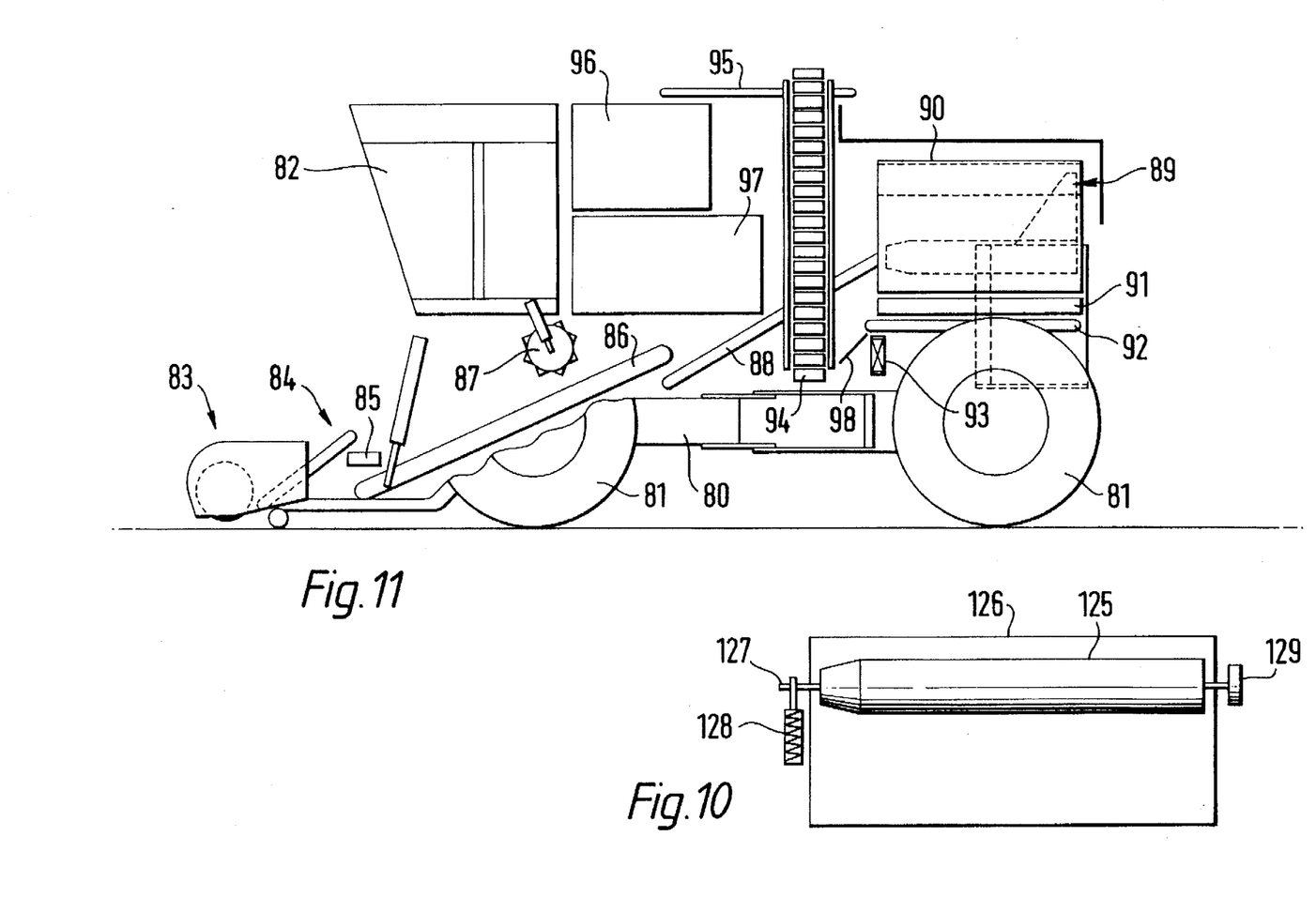
FIG. 10 is a top elevational view of an alternative embodiment of a vining machine of the invention.
FIG. 11 is a side elevational view of a pea harvesting machine incorporating a pea vining machine and pre-threshing apparatus of the invention.

FIG. 10 shows another embodiment of a mounting arrangement of a rotor 125 in a drum 126 of a vining machine. However, in this embodiment the rotor 125 is mounted within the drum 126 using a carriage 127 at only one end of the rotor. The other end of the rotor is pivotally mounted in a self-aligning bearing 129. Furthermore, the hydraulic ram 25 of the embodiment shown in FIGS. 2 to 4 is replaced by a spring 128. The spring 128 provides a constant force which is exerted by the rotor 125 on material between the rotor 125 and drum 126, and allows movement of the rotor 125 towards and away from drum 126. Since most threshing takes place in the front half of the drum, the amount of material to be passed between rotor 125 and drum 126 at the rear of the drum is considerably less than at the rear thereof. This means that the requirement for movement of the rotor 125 towards and away from the drum 126 at the rear thereof is much less than at the front of the drum.

Providing the force using a spring simplifies the machine, and eliminates the need for the complex hydraulic circuitry as described with reference to FIG. 6.

The spring rating of spring 128 can be chosen according to crop conditions, and is chosen to provide a preferred range of movement of up to approximately 100 mm, more preferably about 70 mm.

FIG. 11 illustrates an embodiment of a pea harvesting machine according to the invention. According to this embodiment, a harvesting machine includes a self-powered wheeled vehicle having a chassis 80 mounted on four wheels 81, with a driver/operator's cab 82 at the front end thereof. Extending forward of the chassis is a powered stripper 89 which lifts the pea vines onto a series of conveyor belts 84 and 85. The conveyor belts lift and deliver the vines to the pre-threshing apparatus which comprises conveyor belt 86 and rotor 87, and is shown in more detail in FIGS. 7 to 9. The threshed peas, unthreshed vines and all other plant material which entered the pre-threshing apparatus, pass onto conveyor 88, which lifts the material and delivers it into one end of a vining machine 89 in accordance with the invention.

Peas and small waste material pass through the perforations in drum 90 onto draper belt 91, comprising a conveyor belt and rotors, which function in the same way as belt 6 as described with reference to FIG. 1. The underside of the conveyor belt 6 may be provided with a series of slats (not shown) which cooperate with the hexagonal rotor as shown in FIG. 1, in order to agitate material on the draper belt 6.

Peas and any waste material fall onto a first conveyor belt 92 mounted beneath draper belt 91. The conveyor 92 delivers the material to a first cleaning device which preferably includes a suction cleaning fan 93 and a perforated plate 98. The suction cleaning fan 93 sucks off any waste material and ejects it from the machine, while the cleaned peas drop onto a lifting belt 94, preferably a bucket elevator, which transfers the peas to a further conveyor belt 95, which transfers the peas to a second cleaning device 96. Second cleaning device 96 comprises a further suction cleaning fan and/or a rotating perforate drum. The size of hole in the perforate drum is chosen according to the size seed (pea) collected. The peas are transferred from the second cleaning device 96 to holding tank 97. Preferably holding tank 97 is adapted to provide for unloading while the machine is still harvesting.

It will be apparent to one of ordinary skill in the art that many changes and modifications can be made in the invention without departing from the spirit or scope of the appended claims.

What is claimed is:

1. A threshing apparatus comprising:

a first and second threshing member between which a legume plant material including pods passes, said first and second threshing members arranged to exert a compressive force on the legume plant material passing therebetween sufficient to open the pods;

said first threshing member having a first end and a second end and mounted by a mounting arrangement which permits said first threshing member to move towards and away from said second threshing member in order to maintain a substantially constant compressive force on the plant material compressed between said threshing members;

said mounting arrangement including at least one hydraulic cylinder and a pressure control system to maintain a substantially constant hydraulic pressure therein, such that said first threshing member automatically moves towards and away from said second threshing member according to the quantity of plant material therebetween.

2. A threshing apparatus according to claim 1, wherein said compressive force may be varied according to the harvesting conditions and crop variety.

3. A threshing apparatus according to claim 1, wherein at least one of said first and second threshing members is driven.

4. A threshing apparatus according to claim 3, wherein at least one of said first and second threshing members is driven to produce a surface speed in excess of a surface speed of the other threshing member.

5. A threshing apparatus according to claim 1, wherein said second threshing member is a drum.

6. A threshing apparatus according to claim 5, wherein said second threshing member is perforate.

7. A threshing apparatus according to claim 1, wherein said mounting arrangement permits each end of said first threshing member to move independently of the other end.

8. A threshing apparatus according to claim 1, wherein said first end of said first threshing member is mounted by a mounting arrangement which includes a roller running in or on a track.

9. A threshing apparatus according to claim 8, wherein said second end of said first threshing member is mounted by a mounting arrangement which provides for said first end to pivot about said second end.

10. A threshing apparatus according to claim 9, wherein said mounting arrangement which provides for pivoting of said first end is a self-aligning bearing.

11. A threshing apparatus according to claim 1, wherein said first threshing member includes protrusions to move the plant material through said threshing apparatus.

12. A threshing apparatus according to claim 4, wherein said first threshing member is driven at a surface speed 10 to 40 percent faster than the other threshing member.

13. A threshing apparatus according to claim 12, wherein at least one of said first and second threshing members is driven at a surface speed 25 percent faster than the other threshing member.

14. A threshing apparatus according to claim 1, wherein said second threshing member comprises a conveyor belt.

15. A threshing apparatus according to claim 14, wherein said first threshing member is mounted above said conveyor belt.

16. A machine for vining, comprising at least one threshing apparatus according to claim 1.

17. A machine for vining according to claim 16, wherein:
said second threshing member comprises a rotatable perforate drum having an internal surface, a means for rotating said second threshing member, and a means for introducing the legume plant material at one end of said second threshing member;
said first threshing member is mounted within said second threshing member and extends over the length thereof, said first threshing member having a means for rotating independently of said second threshing member;
said mounting arrangement permitting said first threshing member to move essentially laterally within said second threshing member in order to maintain a substantially constant compressive force on the legume plant material compressed between said first and second threshing members.

18. A machine for vining according to claim 16 further comprising a second threshing apparatus.

19. A machine for vining according to claim 18 wherein said second threshing apparatus comprises a conveyor belt.

20. A mobile harvesting machine comprising:
a vehicle mounting a threshing apparatus wherein said threshing apparatus comprises:
(a) a first and second threshing member between which a legume plant material including pods passes, said first and second threshing members arranged to exert a compressive force on the legume plant material passing therebetween sufficient to open the pods;
(b) said first threshing member having a first end and a second end and mounted by a mounting arrangement which permits said first threshing member to move towards and away from said second threshing member in order to maintain a substantially constant compressive force on the plant material compressed between said threshing members;
(c) said mounting arrangement including at least one hydraulic cylinder and a pressure control system to maintain a substantially constant hydraulic pressure therein, such that said first threshing member automatically moves towards and away from said second threshing member according to the quantity of plant material therebetween; and means for gathering the legume plant material and feeding the legume plant material to said threshing apparatus.

21. A mobile harvesting machine according to claim 20, further comprising a second threshing apparatus.

22. A mobile harvesting machine according to claim 20, wherein said harvesting machine is self propelled.

* * * * *

UNITED STATES PATENT AND TRADEMARK OFFICE
CERTIFICATE OF CORRECTION

| | | |
|---|---|---|
| PATENT NO. | : | 5,718,629 |
| DATED | : | FEBRUARY 17, 1998 |
| INVENTOR(S) | : | DAVENPORT |

It is certified that error appears in the above-identified patent and that said Letters Patent is hereby corrected as shown below:

Cover Page    [30] Foreign Application Priority Data: "95/04281" should read —95/04281.8—

Cover Page [56] References Cited, Other Publications: delete second occurrence of the following: "Product Literature – FMC: "Pod Stripper – PSC-125" (4 pgs).(Date Unknown)."

Signed and Sealed this

Fifteenth Day of June, 1999

Attest:

Q. TODD DICKINSON

Attesting Officer    Acting Commissioner of Patents and Trademarks